No. 648,248. Patented Apr. 24, 1900.
G. H. EDWARDS.
APPARATUS FOR TREATING SWEET POTATOES.
(Application filed Dec. 18, 1899.)
(No Model.) 2 Sheets—Sheet 1.
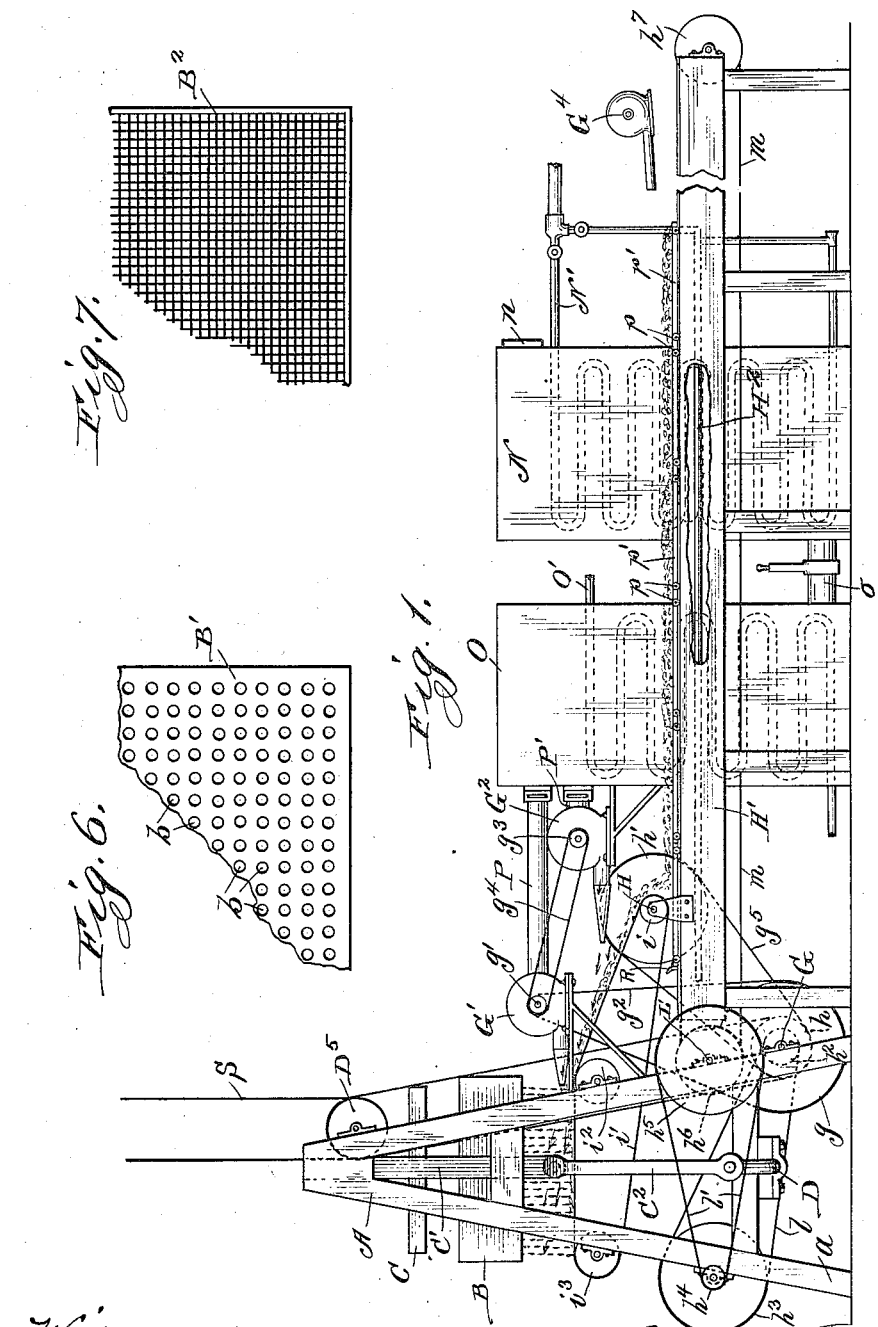

No. 648,248. Patented Apr. 24, 1900.
G. H. EDWARDS.
APPARATUS FOR TREATING SWEET POTATOES.
(Application filed Dec. 18, 1899.)
(No Model.) 2 Sheets—Sheet 2.
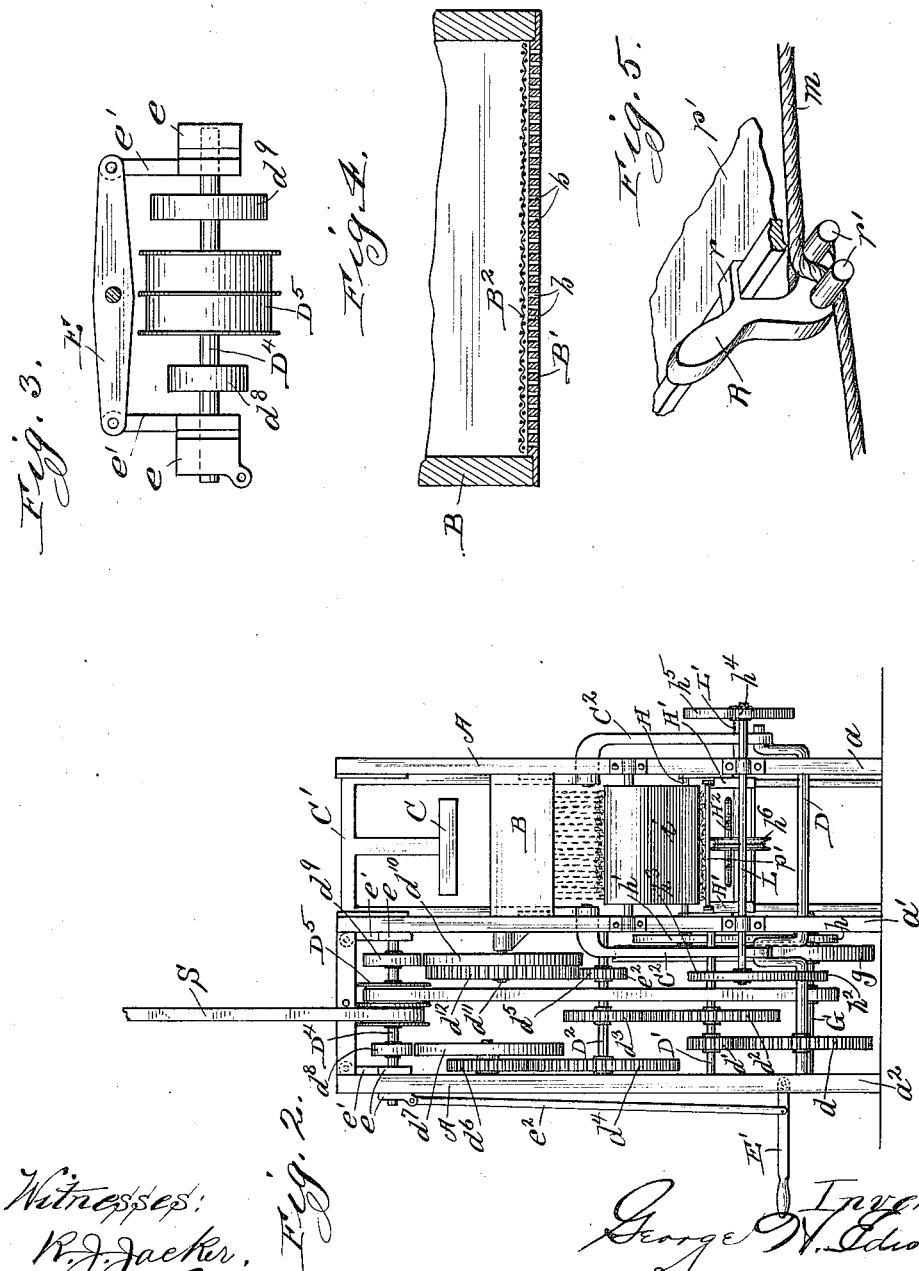

UNITED STATES PATENT OFFICE.

GEORGE H. EDWARDS, OF CHICAGO, ILLINOIS.

APPARATUS FOR TREATING SWEET POTATOES.

SPECIFICATION forming part of Letters Patent No. 648,248, dated April 24, 1900.

Application filed December 18, 1899. Serial No. 740,689. (No model.)

*To all whom it may concern:*

Be it known that I, GEORGE H. EDWARDS, a citizen of the United States, residing at Chicago, in the county of Cook and State of Illinois, have invented certain new and useful Improvements in Apparatus for Treating Sweet Potatoes, of which the following is a specification.

This invention relates to improvements in an apparatus to be used for preparing sweet potatoes for desiccation and preserving them by desiccation; and it consists in certain peculiarities in the construction, novel arrangement, and operation of the various parts thereof, as will be hereinafter more fully set forth and specifically claimed.

The objects of my invention are, first, to provide an apparatus whereby the pulp of the potatoes may be readily and economically separated from the skins and divided into small particles or shreds; second, to provide means for forcing currents of sterilized and moderated air against the particles of pulp as soon as they leave the skins and afterward; third, to furnish means for conveying the shreds or particles of pulp over a subjacent heater and at the same time for forcing a current of air against or above said particles of pulp to remove therefrom the saturated air, and, fourth, to provide means whereby the movement of the press employed for separating the pulp from the skins of the potatoes may be regulated, without reference to the resistance thereof, so that the downward motion of the press may be slow, while its upward motion shall be rapid, to save time.

Unlike any other vegetable or natural article of food, as far as I am aware, the sweet potato contains starch, sugar, and gluten to such an extent that it decays very rapidly, and repeated efforts to dry or evaporate this vegetable for the purpose of preserving it with the proper flavor and color have hitherto proven unsuccessful. I have discovered by long experiment that this failure is due to the fact, first, that a temperature of over 165° Fahrenheit converts the starch into dextrin, and, second, that the germs of fermentation existing in warm atmospheric air when applied to the pulp quickly sour the sugar. To avoid the production of dextrin, the pulp must never be raised to a temperature above 165°.

To avoid the contaminating influences of the atmosphere on the sugar, sterilized air must be used, and yet the pulp of this vegetable is so delicate that it would suffer if the air were sterilized chemically and carried with it any gaseous product. In an application, serially numbered 738,649, filed by me November 29, 1899, and now pending I set forth a process for preserving sweet potatoes consisting, essentially, in sterilizing atmospheric air by a heat of about 212° Fahrenheit, then moderating this sterilized air in a closed chamber until its temperature is reduced below 165°, and then applying this moderated sterilized air in a blast to the shredded pulp of the sweet potato in the open air and in such way as to dissipate the moisture and germs of fermentation overhanging the machine and not permit them to come in contact with the pulp or at least not until the same has been partially dried. In the present application I have shown one type of machine for carrying out that process, and in addition to blowing the sterilized and moderated air upon the pulp from above as it passes through the machine I also heat the pulp-carrying trays from beneath by any suitable means, such as steam-coils or the like. This practically doubles the speed with which the drying is effected without losing any of the advantages of the process in the other case.

I am aware that it is old to apply a current of air at a very high temperature (such as 300°) to desiccated food products for the purpose of cooking them, that it is old in many instances to apply blasts of hot air for drying purposes, and that one device has been patented for drying the waste products from breweries through the use of a hot blast consisting of the products of combustion from a furnace mingled with the atmospheric air; but in all such instances the apparatus is located within a closed chamber. No process or machine has been devised, to my knowledge, which will successfully dry the pulp of a sweet potato so as to preserve it, and the present invention is designed to serve that end and yet accomplish it out of doors, in any season or climate, and on such a large scale, and yet so economically, that the product will be a commercial possibility.

In order to enable others skilled in the art to which my invention pertains to make and use the same, I will now proceed to describe it, referring to the accompanying drawings, in which—

Figure 1 is a view in side elevation of my apparatus, showing the parts in position ready for use. Fig. 2 is a view in elevation of the end of the apparatus carrying the driving mechanism for the press or separator. Fig. 3 is a detached view of the lever used for changing the speed of the driving mechanism and showing a sheave and friction-wheels journaled thereon. Fig. 4 is a sectional view of the box of the separator or press. Fig. 5 is a fragmental view of one of the trays to receive the particles of pulp, showing a means for connecting it to a traveling cable. Fig. 6 is a fragment of the perforated plate used in the box or separator, and Fig. 7 is a similar view of a wire sieve also used in the box or the press.

Similar letters refer to like parts throughout the different views of the drawings.

A represents the main or supporting frame for the press or separator and its operating mechanism, which frame comprises uprights or standards $a$, $a'$, and $a^2$, on which the various shafts of the driving mechanism are journaled.

Located at a suitable point between the uprights $a$ and $a'$ is a box B, the top of which is open and the bottom of which is provided with a plate B', having a series of perforations $b$ of any suitable size. Within the box B is placed a wire sieve $B^2$, on which the potatoes are placed when it is desired to separate the pulp thereof from the skin. Located above the box B, so as to fit therein, is a plunger C, which is carried by a yoke C', vertically and movably mounted between the standards $a$ and $a'$, as is clearly shown in Figs. 1 and 2 of the drawings. To the lower ends of the yoke C' are connected pitman-rods $C^2$, whose other ends are connected to a crank-shaft D, suitably journaled on the supporting-frame. Mounted on the crank-shaft D is a gear $d$, which meshes with a gear $d'$ on the counter-shaft D', which shaft also carries a gear $d^2$, which meshes with a gear $d^3$ on a shaft $D^2$. This shaft I call the "speed-shaft," because through it the proper speeds of movement of the plunger are produced. It carries large and small gears $d^4$ and $d^5$, the former of which meshes with a smaller gear $d^6$ mounted on a stub-shaft $D^3$, which carries a friction-wheel $d^7$ to contact with a friction-wheel $d^8$, mounted on the driving-shaft $D^4$, which has its bearings or journal-boxes $e$ vertically adjustable on the upper portions of the standards $a'$ and $a^2$ of the supporting-frame. Fulcrumed on the upper portion of the supporting-frame is a rocking lever E, which has its ends connected to the journal-boxes $e$ of the driving-shaft $D^4$ by means of rods or bars $e'$, thus suspending said shaft. Pivotally secured at one of its ends to one of the boxes $e$ is a rod $e^2$, whose other end is pivotally secured to a hand-lever E', fulcrumed on the lower portion of the supporting-frame.

Mounted on the driving-shaft $D^4$ is a double power-pulley $D^5$ and a friction-wheel $d^9$, which wheel is to contact with the friction-wheel $d^{10}$, mounted on the stub-shaft $d^{11}$, on which is also mounted a gear $d^{12}$, which meshes with the gear $d^5$ on the speed-shaft $D^2$.

Mounted on the shaft G is a pulley $g$, which is connected to a pulley $g'$ by means of a belt $g^2$, the pulley $g'$ being mounted on a shaft of a blower or fan G', located near the box B or separator. Passing over the pulley $g'$ and another pulley $g^3$ on the shaft of the blower $G^2$ is a belt $g^4$, which drives the last-named pulley. Mounted on the shaft G is a pulley $h$, which is connected to a pulley $h'$ by means of a belt $g^5$. The shaft H, on which the pulley $h'$ is mounted, is journaled on a box-frame H', in which are located steam-pipes $H^2$, and which frame extends from near the separator to any desired distance. On the shaft H is mounted a roller $i$, over which passes an endless belt $i'$, which also passes under the separator and over idle rollers $i^2$ and $i^3$, mounted on suitable shafts journaled on the supporting-frame. Mounted on the shaft G is a pulley $h^2$, which is connected to a pulley $h^3$ by means of a belt $l$, the last-named pulley being mounted on a shaft L, journaled on the main frame, on the opposite end of which shaft is mounted a pulley $h^4$, which is connected to a pulley $h^5$ by means of a belt $l'$.

On the shaft L', on which the pulley $h^5$ is mounted, is also mounted a sheave $h^6$, over which passes a cable $m$, used for carrying the trays along the box-frame H', which, as before stated, is provided with steam-pipes. The cable $m$ passes over a pulley or sheave $h^7$, journaled on the farther end of the box-frame, beyond which is the receptacle (not shown) into which the treated product is delivered by the trays.

Located at a suitable point, but usually near the frame H', is a chamber or compartment N, in which is located a coil of steam-pipe N', which is connected at one of its ends to a source of steam-supply. (Not shown.) The upper portion of the receptacle or chamber N is provided with a valve $n$ for the intake of air. Extending from the lower portion of the receptacle N and communicating with another receptacle O is a pipe $o$, which conveys the heated air from the compartment N to the compartment O, the last-named compartment being provided with a coil O' of water-pipe to be used for moderating the heat of the air. Leading from the compartment or receptacle O are pipes P and P', which communicate with the casings of the blowers G' and $G^2$, respectively.

By reference to Fig. 2 of the drawings it will be seen that the top of the box-frame H' is open and that its sides form rails or tracks upon which the wheels $p$ of the trays $p'$ may travel, which trays may be made of any suitable size, form, and material and are for the toes, the combination with a main frame supporting a box having a foraminous bottom, a plunger therein, a driving-shaft having two pulleys one of them belted to a source of power, and connections between this shaft and the plunger for moving the latter; of an open box-frame having tracks, trays moving thereon, an endless belt leading from beneath the box and delivering onto said trays, connections between this belt and the other pulley on the driving-shaft, and means for directing blasts of hot sterilized air onto the pulp upon this belt and immediately as it issues from the bottom of said box, as and for the purpose set forth.

6. In an apparatus for drying sweet potatoes, the combination with a main frame supporting a box having a foraminous bottom, a plunger therein, a driving-shaft having two pulleys one of them belted to a source of power, and connections between this shaft and the plunger for moving the latter; of an open box-frame having tracks, trays moving thereon, subjacent steam-pipes for heating said trays from beneath, an endless belt leading from beneath the box and delivering onto said trays, connections between this belt and the other pulley on the driving-shaft, and means for directing a blast of hot sterilized air onto the pulp immediately as it issues from the bottom of said box, as and for the purpose set forth.

7. In an apparatus for drying sweet potatoes, the combination with a main frame supporting a box having a foraminous bottom, a plunger therein, a driving-shaft, and connections between this shaft and the plunger for moving the latter; of tracks, trays moving thereon, subjacent steam-pipes heating said trays from beneath, a cable to which the trays are attached, an endless belt leading from beneath the box and delivering onto said trays, connections leading from the driving-shaft for moving said cable and endless belt, and means for directing a blast of hot sterilized air onto the pulp immediately as it issues from the bottom of said box, as and for the purpose set forth.

8. In an apparatus for treating sweet potatoes, the combination with means for separating the pulp from the skins, a series of moving trays, and an endless belt delivering the pulp from the separator onto the trays, the whole being located in the open air; of a fan delivering a blast of air onto the pulp as it issues from the separator, two closed chambers connected by a pipe, one of them having an air-intake and the other being connected with said fan, steam-heating coils within the first chamber for raising the temperature of the air to about 212° Fahrenheit, and water-pipes within the second chamber for moderating its temperature so that it issues from the fan at about 165° Fahrenheit, substantially as specified.

9. In an apparatus for treating sweet potatoes, the combination with means for separating the pulp from the skins, a series of moving trays, subjacent steam-pipes for heating said trays from beneath, and an endless belt delivering the pulp from the separator onto the trays, the whole being located in the open air; of a fan delivering a blast of air onto the pulp as it issues from the separator, a closed chamber having an air-intake and an outlet-pipe, a steam-coil in this chamber for raising the temperature of the air therein to about 212° Fahrenheit, and means for moderating the temperature of the air passing through the outlet-pipe and delivering it to said fan without the admixture of foreign fluids, as and for the purpose set forth.

10. In an apparatus for treating sweet potatoes, the combination with means for separating the pulp from the skins, a series of moving trays, and an endless belt delivering the pulp from the separator onto the trays, the whole being located in the open air; of a fan delivering a blast of air onto the pulp as it issues from the separator, a closed chamber having an air-intake and an outlet-pipe, a steam-coil in this chamber for raising the temperature of the air therein to about 212° Fahrenheit, and means for moderating the temperature of the air passing through the outlet-pipe and delivering it to said fan without the admixture of foreign fluids, as and for the purpose set forth.

11. In an apparatus for treating sweet potatoes, the combination with means for separating the pulp from the skins, a series of moving trays, subjacent steam-pipes for heating said trays from beneath, and an endless belt delivering the pulp from the separator onto the trays, the whole being located in the open air; of a fan delivering a blast of air onto the pulp as it issues from the separator, a closed chamber connected by a pipe to this fan, means for raising air to a sufficiently-high temperature to sterilize it and then admitting it to this chamber, and a water-coil within said chamber for moderating the temperature of the air issuing from the fan to about 165° Fahrenheit, as and for the purpose set forth.

12. In an apparatus for treating sweet potatoes, the combination with means for separating the pulp from the skins, a series of moving trays, and an endless belt delivering the pulp from the separator onto the trays, the whole being located in the open air; of a fan delivering a blast of air onto the pulp as it issues from the separator, a closed chamber connected by a pipe to this fan, means for raising air to a sufficiently-high temperature to sterilize it and then admitting it to this chamber, and a water-coil within said chamber for moderating the temperature of the air issuing from the fan to about 165° Fahrenheit, as and for the purpose set forth.

13. In an outdoor apparatus for treating sweet potatoes, the combination with a separator for desiccating the pulp, a frame, a series of trays moving therein, means for heat-purpose of conveying the potato pulp slowly over the steam-pipes H² in the box-frame.

In Fig. 5 of the drawings I have shown a detachable grip to be used for connecting one of the trays to the cable m, which propels them, and which grip comprises a body R, having a hook r to engage the tray and two parallel projections r' to engage the cable.

In Fig. 1 of the drawings I have shown the blowers G' and G² located so as to receive air from the moderating-chamber O and to discharge it against the divided pulp as it falls from the press and while on the endless belt i' used to convey the pulp to the trays; but I may discharge air under pressure from the receptacle O onto the pulp as it issues from the press and while on the traveling belt by any suitable means. I have also shown in Fig. 1 another blower G⁴, which may be driven by any suitable means and located at a proper point to force a current of air over the trays p' to remove the saturated air therefrom, and thus more quickly dry the pulp.

The operation of my apparatus is as follows: Potatoes are placed in the box B while the plunger C is in its raised position, when by applying power to the driving mechanism through the medium of the belt S, which may be connected to a source of power, (not shown,) and by pressing down on the hand-lever E', the friction-roller $d^8$ will be brought into contact with the roller $d^7$ and through its gearing will operate the crank-shaft D, which will cause the plunger to descend very slowly, but with great force, thus separating the pulp of the potatoes from the skins and forming it into small particles or shreds, which will issue from the bottom of the box very slowly and while so issuing will be subjected immediately to currents of sterilized air forced through the blowers G' and G² or otherwise, as above stated. As the pulp falls from the box or press it will drop to the endless belt i', which will convey it to the trays p', which are caused to travel on the box-frame H' by means of the endless cable m. The steam-pipes within the box-frame H' are employed to heat the air under the trays, and as the heated air rises above the trays it will absorb moisture from the pulp, and to prevent the saturated air hanging over the pulp I prefer to use the fan or blower G⁴ to drive it away, thus allowing more air to come in contact with the pulp.

To dry the pulp, so that it will not contain any of the germs of fermentation and in such manner that none of the starch in it will be changed to dextrin, I employ the sterilizing-chamber N and the moderating-chamber O. In the former the air is heated to a temperature high enough to kill all germs of fermentation and to otherwise sterilize the air, and from this chamber the air is passed into the chamber O, where it is moderated by means of the water-pipe o' to a proper degree to prevent the formation of dextrin in the starch of the pulp when it is blown into the latter. After the plunger C has reached the end of its stroke the lever E' may be raised, which operation will bring the friction-roller $d^9$ into contact with the roller $d^{10}$ and through its gearing with the crank-shaft raise the piston very rapidly.

While I have shown the blowers and cable as being operated by the mechanism employed for operating the plunger, yet it is evident that other means may be employed.

Having thus fully described my invention, what I claim as new, and desire to secure by Letters Patent, is—

1. A lever pivoted between its ends, two journal-boxes, links connecting them with said ends, a shaft journaled in said boxes and having a centrally-disposed pulley, and a belt leading thence to a source of power; combined with wheels on the shaft near its ends, other wheels with which they are adapted to engage, and means for rocking the lever on its pivot, as and for the purpose set forth.

2. A lever pivoted between its ends, two journal-boxes, links connecting them with said ends, a shaft journaled in said boxes and having a centrally-disposed pulley, and a belt leading thence to a source of power; combined with wheels on the shaft near its ends, other wheels with which they are adapted to engage alternately, a power-shaft, and two trains of gears proportioned for different speeds and leading respectively from said other wheels to and connecting with said power-shaft, as and for the purpose set forth.

3. The combination with a box having a foraminous bottom, a plunger, a crank-shaft connected with the plunger, a speed-shaft having large and small gears, and connections between said shafts; of two independent friction-wheels having respectively small and large gears meshing with the large and small gears on the speed-shaft, a rocking lever supporting journal-boxes, the driving-shaft journaled therein and having a centrally-disposed power-pulley belted to a source of power, and friction-wheels on this shaft adapted to be thrown into alternate engagement with said independent friction-wheels, as and for the purpose set forth.

4. The combination with a box having a foraminous bottom, a plunger, a crank-shaft connected with the plunger, a speed-shaft having large and small gears, and connections between said shafts; of two independent wheels having respectively small and large gears meshing with the large and small gears on the speed-shaft, a rocking lever supporting journal-boxes, the driving-shaft journaled therein and having a centrally-disposed power-pulley belted to a source of power, wheels on this shaft adapted to be thrown into alternate engagement with said independent wheels, a hand-lever, and a rod connecting it with one of said boxes, all as and for the purpose set forth.

5. In an apparatus for drying sweet potaing them from below, and an endless belt delivering the pulp from the separator to the trays; of two connected closed chambers, the first having an air-intake and the latter leading to a point to deliver the air on the pulp upon the belt, means for raising the air in the first chamber to a temperature sufficient to sterilize it, and means for moderating the temperature in the second chamber to a point where it will not produce dextrin in the pulp, as and for the purpose set forth.

14. In an outdoor apparatus for treating sweet potatoes, the combination with a separator for desiccating the pulp, a frame, a series of trays moving therein, and an endless belt delivering the pulp from the separator to the trays; of two connected closed chambers, the first having an air-intake and the latter leading to a fan delivering the air on the pulp upon the belt, means for raising the air in the first chamber to a temperature sufficient to sterilize it, and means for moderating the temperature in the second chamber to a point where it will not produce dextrin in the pulp, as and for the purpose set forth.

GEORGE H. EDWARDS.

Witnesses:
  CHAS. C. TILLMAN,
  A. GUSTAFSON.